UNITED STATES PATENT OFFICE.

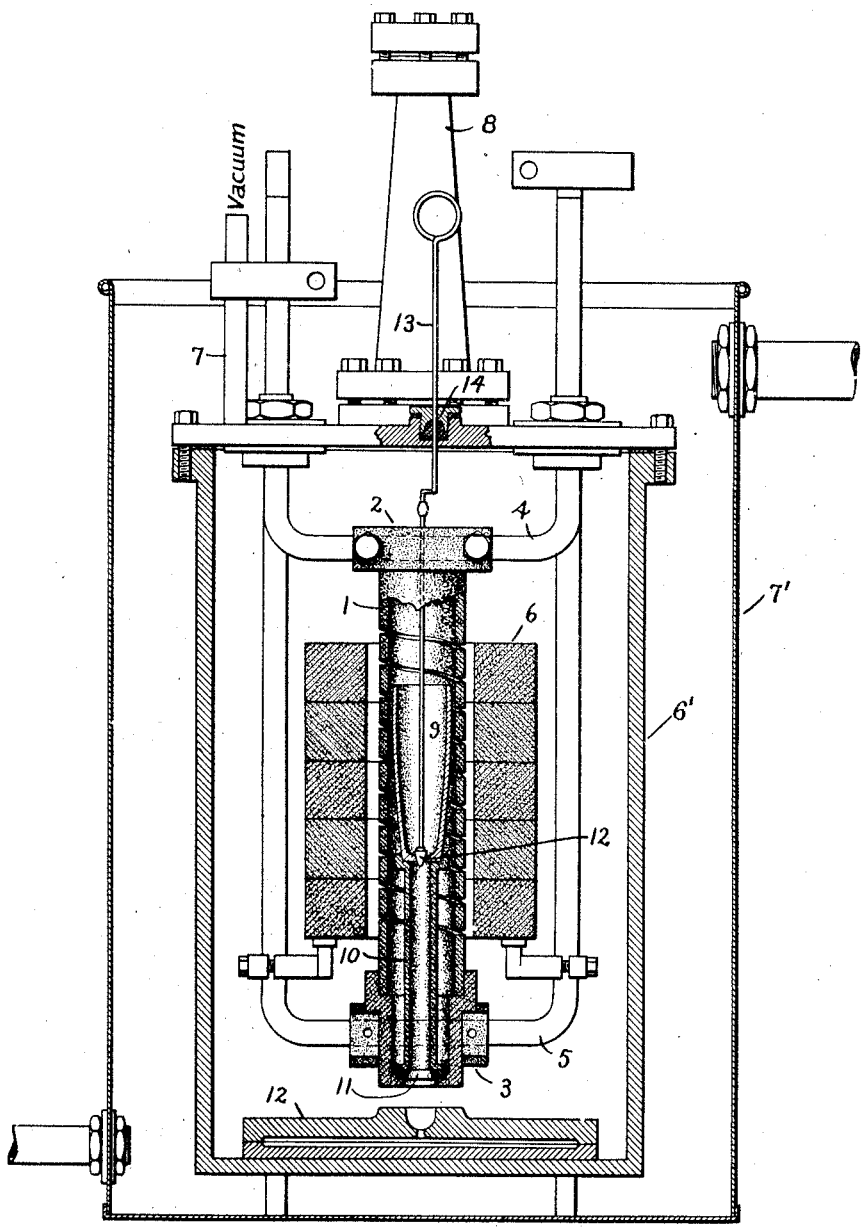

WILLIS R. WHITNEY, OF SCHENECTADY, NEW YORK, ASSIGNOR TO GENERAL ELECTRIC COMPANY, A CORPORATION OF NEW YORK.

MANUFACTURE OF QUARTZ APPARATUS.

1,022,910.  Specification of Letters Patent.  Patented Apr. 9, 1912.

Application filed January 7, 1908. Serial No. 409,677.

*To all whom it may concern:*

Be it known that I, WILLIS R. WHITNEY, a citizen of the United States, residing at Schenectady, county of Schenectady, State of New York, have invented certain new and useful Improvements in the Manufacture of Quartz Apparatus, of which the following is a specification.

My present invention relates to the manufacture of vessels and other apparatus from refractory materials, such as quartz, for laboratory and industrial work.

Quartz vessels possess many valuable properties and are of great convenience to chemists and other industrial workers. Heretofore they have always commanded a high price because of the difficulties of manufacture. One process of manufacture consists in building up a vessel under an oxyhydrogen flame by melting down small crystals of quartz, one at a time, and sticking them in place while at this high temperature. Vessels made in this way are clear and transparent but are usually somewhat irregular in shape and are always very expensive. According to a second method, the quartz is melted in an iridium crucible until it attains a fluid or semi-fluid condition and is then cast to the desired shape in suitable refractory molds. This second method is also expensive because of the cost of the iridium crucible, the life of which is not long. The product has the disadvantage of being clouded by the presence of minute air bubbles retained in the quartz mass after melting.

It is the object of my present invention to produce clear, transparent vessels, and similar apparatus, by an improved method whereby their cost of manufacture is small and whereby complex and irregular shapes are easily obtainable.

To this end I have devised a novel apparatus as hereinafter described somewhat in detail.

In the drawing, forming a part of this specification, is shown a vacuum furnace of the general type described in United States patent to Arsen, #785,535, March 21, 1905, but differing therefrom in several essentials.

The heating element of the furnace consists of a tube 1 of graphite or tungsten supported at each end in blocks 2 and 3 of refractory material clamped to copper tubes 4 and 5, whereby current may be conducted to and from the heating member 1. Water may be circulated through these tubes to cool the ends of the heating member and to prevent fusion of the tubes themselves.

The heating member 1 may, if desired, have a helical slot, as shown in the drawing, and is preferably surrounded by a refractory shield 6 for preventing radiation of heat outward from the heater. The members above mentioned are inclosed in an evacuated gun metal box 6' having a tubular outlet 7 for connection with a vacuum pump and having a sight tube 8 and other accessories, as more fully described in the patent above referred to. This gun metal box 6' may be conveniently inclosed in a sheet metal jacket 7' through which water or other cooling liquid is circulated.

To use this apparatus for the manufacture of quartz vessels I mount a tungsten or tantalum crucible 9 on a tubular pedestal 10 of refractory metal or of graphite, separated from the terminal block 3 by a refractory insulating washer 11. The refractory crucible 9 has a hole in its bottom which can be closed by a tapered plug 12 carried on the end of a tungsten rod which extends upward through the crucible and is provided with a metal extension 13 passing through a stuffing box 14 and having an offset sufficient to carry it to one side of the sight tube 8.

In the use of the apparatus above described for the production of silica vessels and apparatus, I proceed by placing quartz crystals or suitably pure silica in the tungsten or tantalum crucible 9, and I then exhaust the air from the space around the heater and pass sufficient current through the heating member 1 to gradually fuse the silica in the crucible. During this fusion the vacuum pump is maintained in continuous operation and serves to draw off all air and gases which might otherwise remain in the fused silica to the detriment of the finished product. When the quartz or silica has been entirely freed from these gases and is sufficiently fluid to run freely in a mold, I proceed by pulling the plug 12 from the bottom of crucible 9, thereby allowing the fused material to run down through the hollow pedestal 10 into a refractory mold or receptacle 12 placed immediately beneath.

As I have previously stated, the finished product is clear and transparent like the best blown silica vessels, and it has the advantage thereover of being more regular in shape. Like all other quartz vessels, those produced by my improved process are chemically inert with respect to most substances and will withstand rapid and violent changes in temperature without breakage.

What I claim as new and desire to secure by Letters Patent of the United States, is,—

1. The method of producing quartz vessels, which consists in melting and casting the quartz while in a substantial vacuum.

2. The method of producing transparent quartz apparatus, which consists in melting and shaping said quartz in a substantial vacuum.

3. The method which consists in heating quartz to a high temperature in an attenuated atmosphere, and shaping said quartz into vessels while out of contact with the air.

4. An apparatus for the production of transparent silica, comprising a crucible consisting of refractory metal inert with respect to silica, means for heating said crucible to the fusion temperature of silica, and means for maintaining a vacuum about said crucible during said heating.

5. An apparatus for producing quartz castings consisting of a refractory container inert to fused quartz, a heater for the container, a refractory mold inert to fused quartz, a vacuum chamber housing the container, heater and mold, and means for discharging the contents of the crucible into the mold within the vacuum chamber.

6. The method of producing vessels from refractory silicious material which consists in melting and maintaining molten said material until entrapped air bubbles are removed and then casting said material while in a substantial vacuum.

7. An apparatus for the production of transparent vessels of silica comprising a refractory crucible consisting of a material inert with respect to silica, means for heating said crucible and its contents by radiation to the fusing temperature of silica, a mold arranged below said crucible, means for releasing the fused silica from said crucible for discharge into said mold, and means for maintaining an attenuated atmosphere about the crucible and the mold.

In witness whereof, I have hereunto set my hand this 6th day of January, 1908.

WILLIS R. WHITNEY.

Witnesses:
EVELYN J. WHITNEY,
HELEN ORFORD.